(12) United States Patent
Huh

(10) Patent No.: US 11,288,356 B2
(45) Date of Patent: Mar. 29, 2022

(54) ELECTRONIC APPARATUS AND CONTROL METHOD THEREOF

(71) Applicant: SAMSUNG ELECTRONICS CO., LTD., Suwon-si (KR)

(72) Inventor: Junho Huh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/959,834

(22) PCT Filed: Jan. 2, 2019

(86) PCT No.: PCT/KR2019/000042
§ 371 (c)(1),
(2) Date: Jul. 2, 2020

(87) PCT Pub. No.: WO2019/135602
PCT Pub. Date: Jul. 11, 2019

(65) Prior Publication Data
US 2020/0372144 A1 Nov. 26, 2020

(30) Foreign Application Priority Data
Jan. 3, 2018 (KR) .................. 10-2018-0000885

(51) Int. Cl.
*G06F 21/36* (2013.01)
*G06F 3/04883* (2022.01)

(52) U.S. Cl.
CPC .......... *G06F 21/36* (2013.01); *G06F 3/04883* (2013.01)

(58) Field of Classification Search
CPC ...... G06F 21/36; G06F 3/04883; G06F 21/31; G06F 3/0488; G06F 2221/2133
See application file for complete search history.

(56) References Cited

U.S. PATENT DOCUMENTS 5,425,102 A * 6/1995 Moy ................. G06F 21/31
713/165
8,650,636 B2 2/2014 Johnson et al.
(Continued)

FOREIGN PATENT DOCUMENTS

| CN | 104090725 | 5/2017 |
| KR | 10-2003-0045404 | 6/2003 |

(Continued)

OTHER PUBLICATIONS

Can LIU, et al., "Where Usability and Security Go Hand-in-Hand: Robust Gesture-Based Authentication for Mobile Systems", Authentication and Access Control, CHI 2017, May 6-11, 2017, pp. 374-386.

(Continued)

*Primary Examiner* — Ernest G Tacsik
(74) *Attorney, Agent, or Firm* — Nixon & Vanderhye, P.C.

(57) ABSTRACT

An electronic apparatus is disclosed. The electronic apparatus includes a display, and a processor configured to, based on a user command for setting unlocking information being input, display a screen including a word on the display, and store information on an object drawn on the screen by a user's gesture as the unlocking information, wherein the word is configured to induce an object related to the word to be drawn on the screen.

10 Claims, 14 Drawing Sheets

(56) References Cited

U.S. PATENT DOCUMENTS

| | | | |
|---|---|---|---|
| 8,904,479 B1* | 12/2014 | Johansson | G06F 21/36 726/2 |
| 9,032,337 B2 | 5/2015 | Oh et al. | |
| 9,230,089 B2 | 1/2016 | Angal | |
| 9,419,966 B2 | 8/2016 | Natividad | |
| 9,558,365 B1* | 1/2017 | Baker | H04L 63/0428 |
| 9,632,574 B2 | 4/2017 | Guerrero et al. | |
| 2007/0150842 A1* | 6/2007 | Chaudhri | G06F 21/36 715/863 |
| 2010/0306718 A1* | 12/2010 | Shim | G06F 21/32 715/863 |
| 2010/0321197 A1 | 12/2010 | Wong et al. | |
| 2011/0265045 A1* | 10/2011 | Hsieh | G06F 3/04883 715/863 |
| 2012/0107779 A1* | 5/2012 | Halton | G06F 40/166 434/188 |
| 2014/0317724 A1 | 10/2014 | Hicks et al. | |
| 2015/0002431 A1 | 1/2015 | Lee et al. | |
| 2017/0083691 A1 | 3/2017 | Chan et al. | |
| 2017/0085592 A1 | 3/2017 | Chan et al. | |

FOREIGN PATENT DOCUMENTS

| | | |
|---|---|---|
| KR | 10-1276866 | 7/2013 |
| KR | 10-2015-0003957 | 1/2015 |
| KR | 10-1565768 | 11/2015 |

OTHER PUBLICATIONS

International Search Report for PCT/KR2019/000042 dated Apr. 8, 2019, 5 pages with English Translation.

Written Opinion of the ISA for PCT/KR2019/000042 dated Apr. 8, 2019, 9 pages with English Translation.

Notice of Preliminary Rejection dated Nov. 20, 2021 in counterpart Korean Patent Application No. 10-2018-0000885 and English-language translation.

* cited by examiner

ELECTRONIC APPARATUS AND CONTROL METHOD THEREOF

This application is the U.S. national phase of International Application No. PCT/KR2019/000042 filed Jan. 2, 2019 which designated the U.S. and claims priority to KR Patent Application No. 10-2018-0000885 filed Jan. 3, 2018, the entire contents of each of which are hereby incorporated by reference.

FIELD

The disclosure relates to an electronic apparatus and a control method. More particularly, the disclosure relates to an electronic apparatus configured to provide a lock screen and a control method thereof.

DESCRIPTION OF RELATED ART

With the development of electronic technology, various electronic devices have been developed. For example, various mobile devices such as smartphones, tablets, etc. have been developed recently, and the mobile devices provide various additional services such as a schedule management service, a photo taking service, etc. in addition to a communication service.

As the mobile devices provide various services, information related to privacy, such as call history, personal schedule, photographed photo, etc. may be stored in the mobile device. Therefore, if information such as a personal schedule stored in the mobile device is leaked, a great invasion of person's privacy may be a problem.

In order to prevent such a problem, the mobile device may provide lock mode. The lock mode may refer to a mode in which only brief information such as a date and time is provided through a display, and information related to privacy stored in the mobile device is not provided.

The lock mode may be unlocked in various ways. For example, the lock mode may be unlocked when a predetermined password is input or a predetermined pattern is input.

For example, a method of unlocking lock mode when a predetermined object is drawn on a screen has been recently developed. When an object predetermined by the user is drawn on the screen of the mobile device, the lock mode of the mobile device is unlocked.

However, a method of unlocking the lock mode based on a predetermined object may cause a problem related to security vulnerability. This is because, in general, the user sets a relatively simple object capable of unlocking the lock mode, such as a checkered shape, an alphabet, or the like.

SUMMARY

The disclosure has been provided to solve the problems described above, and an object of the disclosure is to provide an electronic apparatus for inducing an object related to a specific word to be set as an object capable of unlocking lock mode, and a control method thereof.

An electronic apparatus according to an embodiment of the disclosure includes a display, and a processor configured to, based on a user command for setting unlocking information being input, display a screen including a word on the display, and store information on an object drawn on the screen by a user's gesture as the unlocking information, wherein the word is configured to induce an object related to the word to be drawn on the screen.

The processor may be configured to display a user interface (UI) that induces the object related to the word to be drawn on the screen.

The processor may be configured to display a lock screen including the word on the display in lock mode, and based on an object drawn on the lock screen being corresponded to information on the stored object, unlock the lock mode of the electronic apparatus.

The processor may be configured to, based on the lock screen after the lock mode of the electronic apparatus being unlocked more than a predetermined number of times as the object is drawn on the lock screen including the word, display a lock screen that does not include the word on the display.

The processor may be configured to, based on a user command for changing the word displayed on the screen being input, change the word to another word.

The processor may be configured to, based on a similarity between the object drawn on the screen and at least one of a predefined plurality of objects being matched more than a predetermined threshold value, display a UI that induces the object drawn on the screen to be changed on the display.

The processor may be configured to, while the object is being drawn by the user's gesture, identify the similarity between the object and the predefined plurality of objects, and provide a visual feedback indicating the similarity through the display.

The processor may be configured to, while the object is being drawn by the user's gesture, identify a similarity between an entire object which will be drawn by an additional gesture following the user's gesture and the predefined plurality of objects, and display a color corresponding to the similarity in a direction where the additional gesture will be input.

A control method of an electronic apparatus according to an embodiment of the disclosure includes displaying a screen including a word based on a user command for setting unlocking information being input, and storing information on an object drawn on the screen by a user's gesture as the unlocking information, wherein the word is configured to induce an object related to the word to be drawn on the screen.

The method may further include displaying a UI that induces the object related to the word to be drawn on the screen.

The method may further include displaying a lock screen including the word in lock mode, and unlocking the lock mode of the electronic apparatus based on an object drawn on the lock screen being corresponded to information on the stored object.

The displaying the lock screen may include displaying a lock screen that does not include the word based on the lock screen after the lock mode of the electronic apparatus being unlocked more than a predetermined number of times as the object is drawn on the lock screen including the word.

The method may further include changing the word to another word based on a user command for changing the word displayed on the screen.

The method may further include based on a similarity between the object drawn on the screen and at least one of a predefined plurality of objects being matched more than a predetermined threshold value, displaying a UI that induces the object drawn on the screen to be changed.

The method may further include, while the object is being drawn by the user's gesture, identifying the similarity between the object and the predefined plurality of objects, and providing a visual feedback indicating the similarity.

The method may further include, while the object is being drawn by the user's gesture, identifying a similarity between an entire object which will be drawn by an additional gesture following the user's gesture and the predefined plurality of objects, and displaying a color corresponding to the similarity in a direction where the additional gesture will be input.

According to various embodiments of the disclosure as described above, a relatively simple object such as a checkered shape may be prevented from being set as an object capable of unlocking lock mode, and furthermore, a security vulnerability of the electronic apparatus caused by setting a simple object may be solved.

DETAILED DESCRIPTION OF EXAMPLE EMBODIMENTS

The terms used in the disclosure and the claims are general terms selected in consideration of the functions of the various example embodiments of the disclosure. However, such terms may be varied depending on an intention of those skilled in the art, a legal or technical interpretation, an emergence of a new technology, and the like. Also, there may be some terms arbitrarily selected by an applicant. Such terms may be construed according to meanings defined in the present specification, and may also be construed based on general contents of the present specification and a typical technical concept in the art unless the terms are not specifically defined.

In describing example embodiments, detailed description of relevant known functions or components may be omitted if it would obscure the description of the subject matter.

Furthermore, embodiments of the disclosure will be described in detail with reference to the accompanying drawings and the contents described in the accompanying drawings, but the disclosure is not limited by the embodiments.

Hereinafter, certain embodiments will now be explained in detail with reference to the accompanying drawings.

Figure 1:
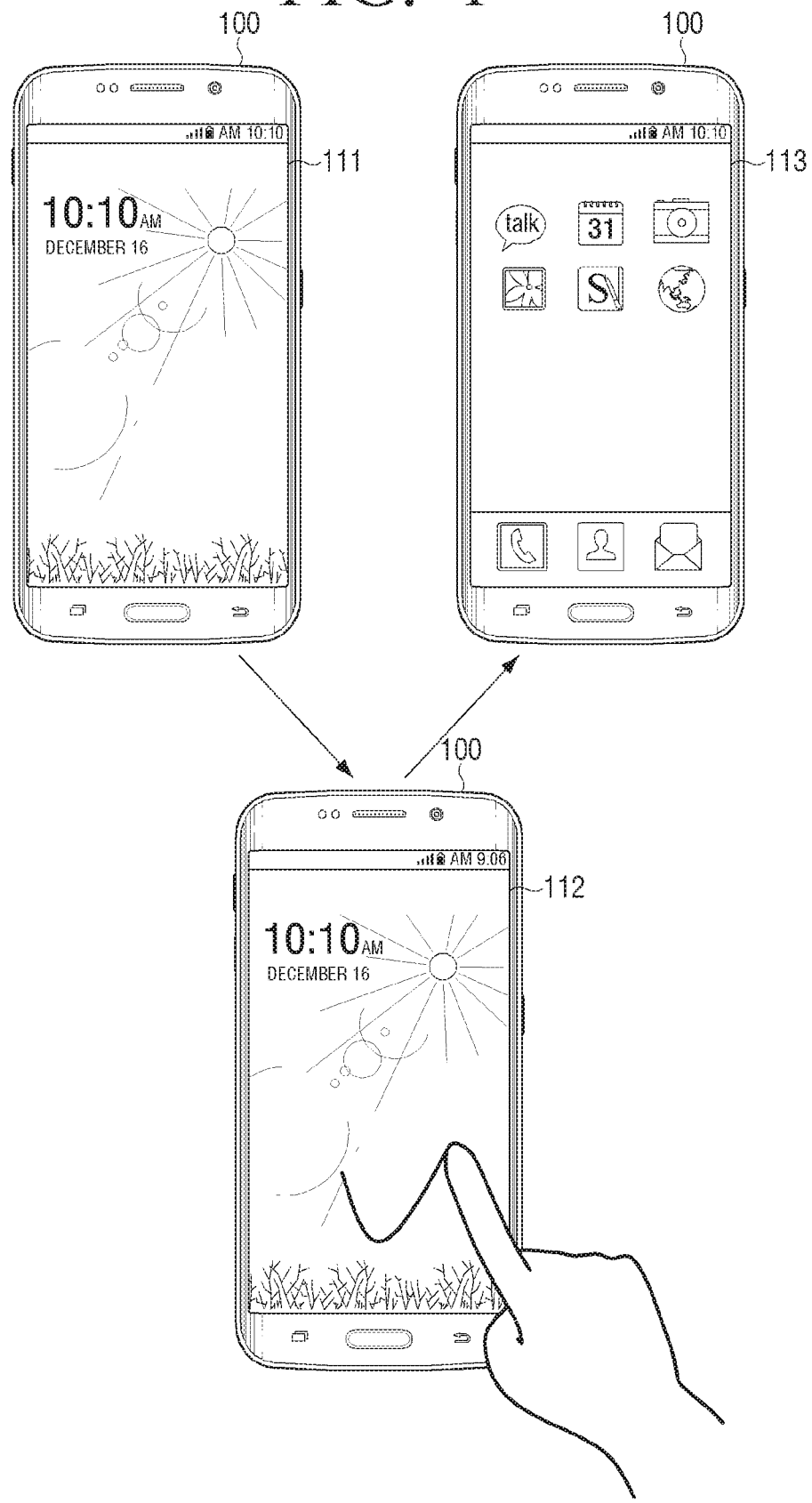
FIG. 1 is a view illustrating an electronic apparatus according to an embodiment of the disclosure.

FIG. 1 is a view illustrating an electronic apparatus according to an embodiment of the disclosure;

Referring to FIG. 1, an electronic apparatus 100 according to an embodiment of the disclosure may be a smartphone. However, this is merely an embodiment, and the electronic may be implemented as various types of electronic devices having a display, such as a tablet, a digital camera, a camcorder, a personal digital assistant (PDA), a smart TV, a computer, or the like.

The electronic apparatus 100 may display a lock screen 111. The lock screen is a screen that can be displayed while the electronic apparatus 100 is operating in lock mode, and the lock screen 111 may include brief information such as a date and time as illustrated in FIG. 1.

While the screen of the electronic apparatus 100 is off, the lock screen 11 may be displayed when a specific button provided on the outside of the electronic apparatus 100 is pressed or when the display of the electronic apparatus 100 is touched.

Then, when the lock mode is unlocked (or release), the electronic apparatus 100 may display an unlock screen 113. Various menus may be included in the unlock screen 113. For example, the unlock screen 113 may include not only a built-in menu provided by the electronic apparatus 100 such as a phone menu, a message menu, or the like, but also a menu that provides an application function such as a schedule management application, a photo taking application, or the like.

The lock mode may be unlocked when a predetermined object 112 is drawn through the screen of the electronic apparatus 100. Specifically, the electronic apparatus 100 may unlock the lock mode when the predetermined object 112 is drawn on an area of the lock screen 111 while the lock screen 111 is displayed.

For example, when a user sets a checkered shaped object as an object capable of unlocking the lock mode, the electronic apparatus 100 may unlock the lock mode when the checkered shaped object is drawn on an area of the lock screen.

However, as for a method of unlocking the lock mode based on the predetermined object, a problem related to security vulnerability may be caused. This is because, in general, the user sets a relatively simple object as an object capable of unlocking the lock mode. For example, an object such as a checkered shape, an alphabet, or the like.

Accordingly, it is necessary to prevent a relatively simple object such as a checkered shape from being set as an object capable of unlocking the lock mode.

For this operation, when a user command for setting an object capable of unlocking the lock mode is input, the electronic apparatus 100 may display an object setting screen including a specific word on the display.

When an object setting screen including a specific word is displayed, a general user may set an object associated with the specific word as an object capable of unlocking the lock mode.

For example, when a user command for setting an object capable of unlocking the lock mode is input, the electronic device 100 may display an object setting screen including a word "food" on the display.

When the word "food" is displayed, the user may associate the word "food" with an object such as "pizza", "hamburger", "cake", "ice cream", or the like and set at least one of the associated objects as an object capable of unlocking the lock mode.

Accordingly, the electronic device 100 according to an embodiment of the disclosure may prevent a relatively simple object, such as a checkered shape, from being set as an object capable of unlocking the lock mode, and solve the problem related to security vulnerability of the electronic apparatus generated by setting a simple object.

Figure 2:
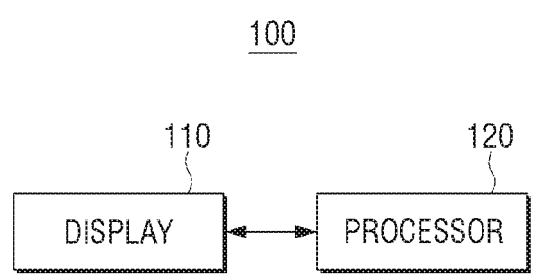
FIG. 2 is a block diagram illustrating an electronic apparatus according to an embodiment of the disclosure.

FIG. 2 is a block diagram illustrating an electronic apparatus according to an embodiment of the disclosure.

Referring to FIG. 2, the electronic apparatus 100 according to an embodiment of the disclosure includes a display 110 and a processor 120.

The display 110 may display various screens.

For example, the display 110 may display a lock screen including brief information such as date, time, or the like, while the electronic device 100 operates in lock mode. Also, when the lock mode of the electronic device 100 is unlocked, the display 110 may display an unlock screen including various menus. The unlock screen may include a built-in menu provided by the electronic device 100, such as a phone call menu, a message menu, etc., as well as a menu providing application functions such as a schedule management application, a photo taking application, or the like.

The display 110 may display a screen for receiving an object capable of unlocking the lock mode, that is, an object setting screen. A specific word may be included in the object setting screen. For example, the display 110 may display an object setting screen including the word "food".

Also, when displaying the lock screen, the display 100 may display a lock screen including the word displayed on the object setting screen.

The display 110 may, for example, be implemented in various forms of displays such as a liquid crystal display (LCD) panel, organic light emitting diodes (OLED), a liquid crystal on silicon (LCoS), a digital light processing (DLP), and the like. Further, the display 110 may further include a driving circuit that may be implemented in the form of an amorphous silicon (a-si) thin-film transistor (TFT), a low temperature poly silicon (LTSP) TFT, or an organic TFT (OTFT), and a backlight unit.

The display 110 may be implemented as a touch screen.

Specifically, the display 110 may be implemented as a touch screen capable of detecting a user's touch input and a drag input following the user's touch. The touch screen may detect a user's touch input and a drag input following the touch through a capacitive overlay. However, this is only an embodiment, and the touch screen may detect a user's touch input and a drag input following the touch through other methods such as a pressure-type, resistive overlay, infrared beam, or the like.

Then, when a touch input is detected, the touch screen may generate coordinate data including information on a point where the touch input is detected, and transmit it to the processor 120. In addition, when a drag input following a touch is detected after the touch, the touch screen may generate coordinate data including information on the detected drag path and transmit it to the processor 120.

The processor 120 may control the overall operation of the electronic apparatus 100.

The processor 120 may, for example, control a number of hardware or software elements connected to the processor 120 by driving an operating system or application program, and perform various data processing and calculations. Further, the processor 120 may load and process a command or data received from at least one of the other components to a volatile memory and store diverse data in a non-volatile memory.

For this operation, the processor 120 may be realized a dedicated processor for performing functions (for example, embedded processor) or a generic-purpose processor for performing functions by running one or more software programs stored in a memory device (for example, a CPU or an application processor).

An operation of the processor of the disclosure will now be described in more detail with reference to FIGS. 3 and 8.

Figure 3:
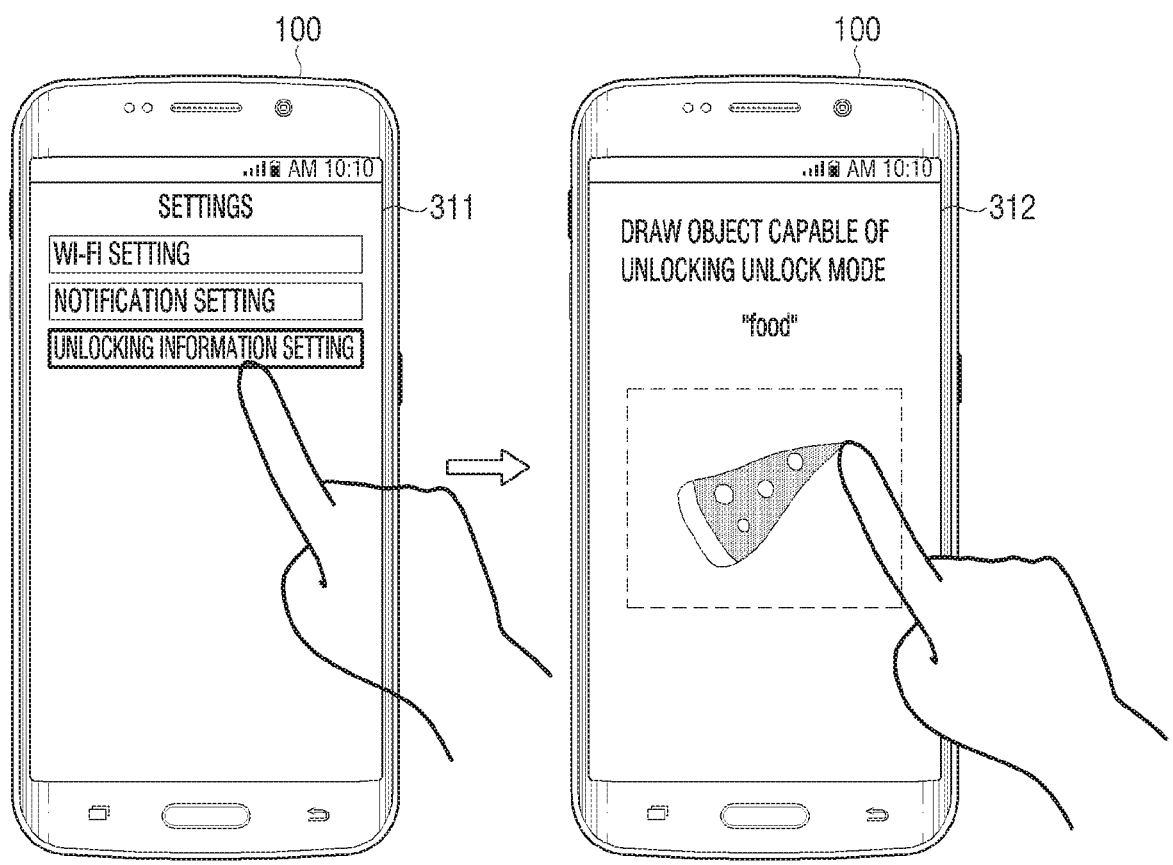
FIG. 3 is a view illustrating an object setting screen according to an embodiment of the disclosure.

FIG. 3 is a view illustrating an object setting screen according to an embodiment of the disclosure.

When a user command for setting unlocking information of the electronic device 100 is input, the processor 120 may display an object setting screen.

Specifically, when a user command for setting unlocking information is input, the processor 120 may display an object setting screen requesting input of an object capable of releasing the lock mode of the electronic device 100.

For example, referring to FIG. 3, when a menu for setting unlocking information is selected by the user from a screen 311 on which a sub-menu included in the setting menu of the electronic apparatus 100 is displayed, the processor 120 may display an object setting screen 312 requiring input of an object capable of unlocking the lock mode of the electronic apparatus 110.

The processor 120 may display an object setting screen including a specific word. The specific word may be a word that induces an object related to the word to be drawn on the screen.

For example, as illustrated in FIG. 3, the specific word may be "food".

Accordingly, the user may associate the specific word with various objects. For example, if the word "food" is included in the object setting screen, the user may associate the specific word with various objects such as "hamburger", "pizza", "bread", "watermelon", "cherry", "cake", or the like.

Then, when the object is drawn on the object setting screen through the user's gesture, the processor 120 may identify the drawn object.

Specifically, the processor 120 may identify an object drawn on the object setting screen by identifying the user's touch input on the object setting screen and a drag following the touch.

For this operation, the processor 120 may use coordinate data received from the touch screen. For example, the processor 120 may identify the user's touch input on the object setting screen through information on the point where the touch input included in the coordinate data received from the touch screen is detected, and identify the object drawn on the object setting screen by identifying the user's drag input on the object setting screen through information on the drag path included in the coordinate data received from the touch screen.

Thereafter, the processor 120 may store information on the object drawn on the object setting screen as unlocking information.

As described above, the electronic device 100 according to an embodiment of the disclosure may induce an object related to a specific word to be drawn on the object setting screen by displaying the specific word on the object setting screen.

FIG. 3 describes that the word displayed on the object setting screen is "food" as an example, but this is only an embodiment, and the word displayed on the object setting screen may be various words such as "sports", "summer", "school", or the like.

In addition, FIG. 3 describes that the word displayed on the object setting screen is one word such as "food" as an example, but this is only an embodiment, and the word displayed on the object setting screen may be a plurality of words such as "food & summer", "sports & school & boy", or the like.

In other words, the type and number of words displayed on the display of the electronic device 100 may not be limited by the accompanying drawings.

Figure 4A:
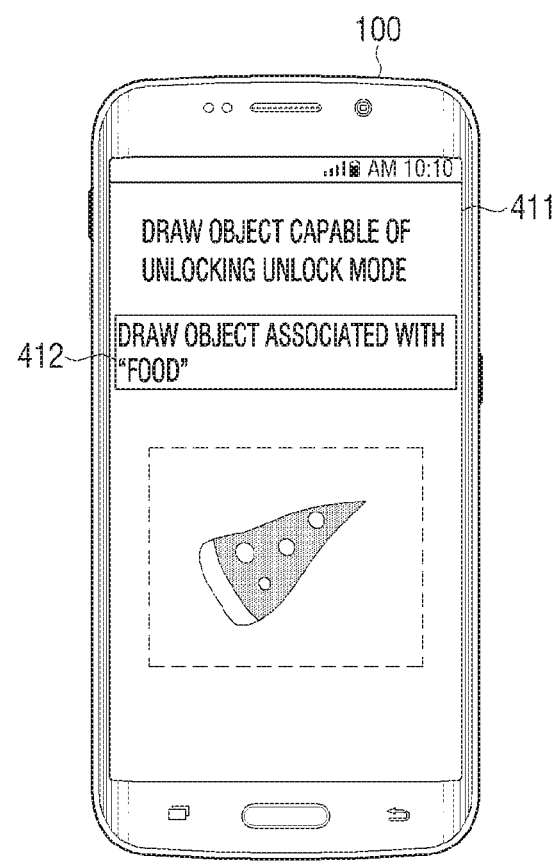
FIGS. 4A and 4B are views illustrating an object setting screen according to an embodiment of the disclosure.
Figure 4B:
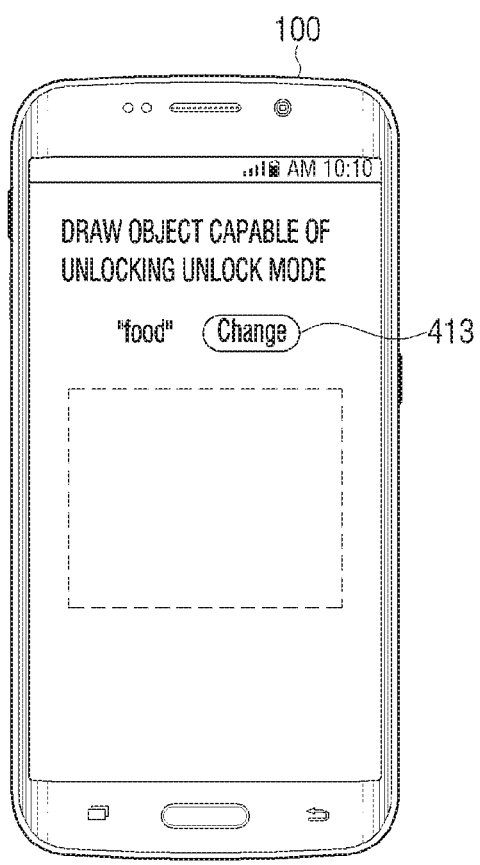

FIGS. 4A and 4B are views illustrating an object setting screen according to an embodiment of the disclosure.

As described above, when a user command for setting unlocking information is input, the processor 120 may display an object setting screen 411 requiring an input of an object capable of unlocking the lock mode of the electronic device 100.

The processor 120 may display a UI that induces an object related to a specific word to be drawn on the object setting screen.

For example, referring to FIG. 4A, the processor 120 may display an object setting screen 411 including a UI 412 "Please draw an object associated with "food"".

Accordingly, the user may associate the word "food" with various objects, and draw the associated object on the object setting screen.

Thereafter, the processor 120 may store information on the object drawn on the object setting screen as unlocking information.

Meanwhile, there may be a case that a specific object may not be associated with a word displayed on the object setting screen from the user's point of view. In this case, it may need to change the word displayed on the object setting screen.

For this operation, the processor 120 may display a UI capable of receiving a word change command on the display. For example, as illustrated in FIG. 4B, the processor 120 may display "change the word" 413 on a display with the UI capable of receiving a word change command.

Then, when a user command for changing the word displayed on the object setting screen is input, the processor 120 may change the word. In other words, when "change the word" 413 in FIG. 4B is selected by the user, the processor 120 may change "food" to another word. For example, the processor 120 may change the "food" to another word such as "sports".

Figure 5:
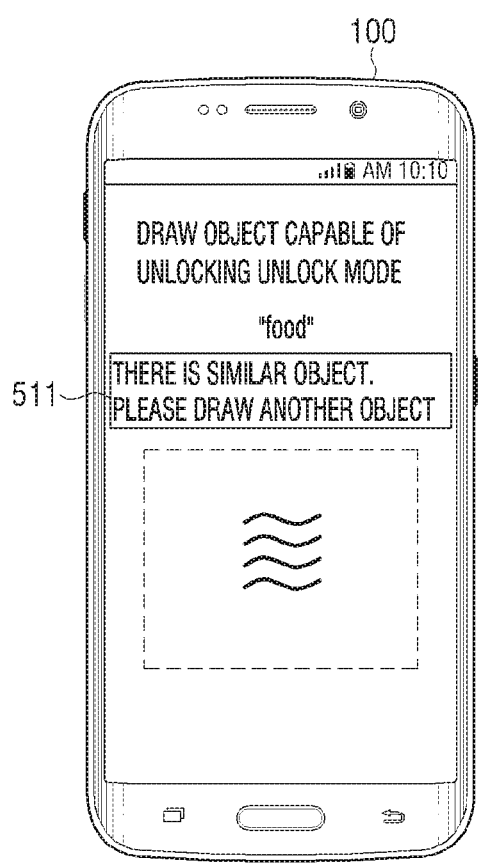
FIG. 5 is a view illustrating an object setting screen according to an embodiment of the disclosure.

FIG. 5 is a view illustrating an object setting screen according to an embodiment of the disclosure.

As described above, the processor 120 may identify an object drawn on the object setting screen.

The processor 120 may identify a similarity between a plurality of predefined objects and an object drawn on the object setting screen. For example, the processor 120 may identify the similarity by comparing a shape of each of the predefined plurality of objects and a shape of the object drawn on the object setting screen. For this operation, the electronic device 100 may further include a storage unit (not illustrated) for storing the plurality of predefined objects.

When at least one object among the plurality of predefined objects matches the object drawn on the object setting screen more than a predetermined threshold value, the processor 120 may display a UI that induces a change of the object drawn on the object setting screen.

For example, the processor 120 may display the UI that induces the change of the object drawn on the object setting screen when the shape of at least one object among the plurality of predefined objects matches the shape of the object drawn on the object setting screen more than the predetermined threshold value.

The predetermined threshold value may be not only a default value but also a value set according to a user command. The predetermined threshold may be 90% as an embodiment.

For example, referring to FIG. 5, the processor 120 may display a UI such as "There is a similar object. Please draw another object" 511, when it is confirmed that at least one object among the plurality of predefined objects matches an object drawn on an object setting screen more than the predetermined threshold value.

As described above, when an object similar to the predefined object is drawn on the object setting screen, the electronic apparatus may induce an object having high security to be set as an object capable of unlocking the lock mode.

Figure 6:
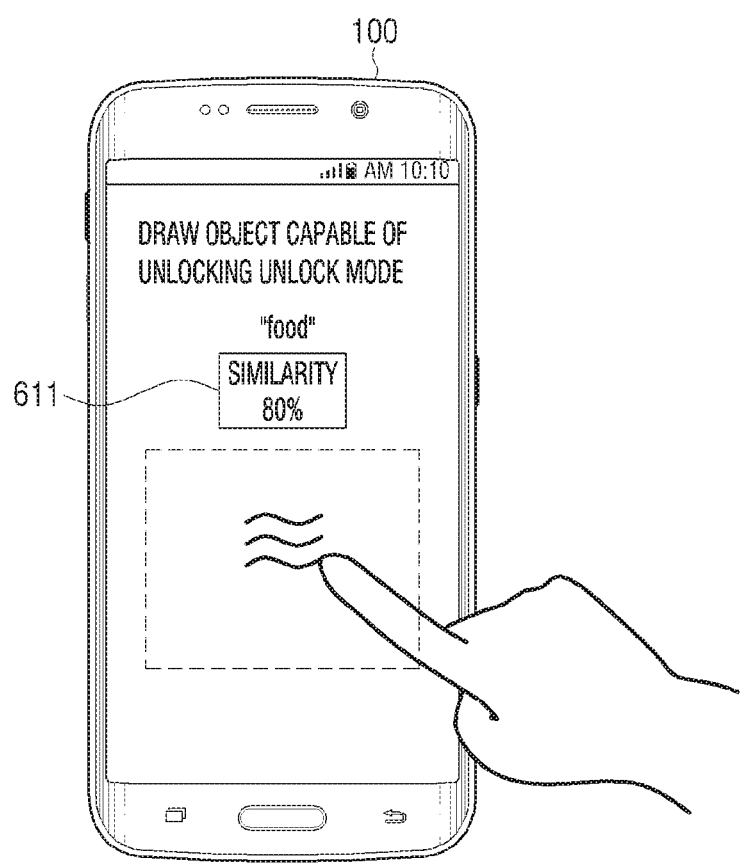
FIG. 6 is a view illustrating an object setting screen according to an embodiment of the disclosure.

FIG. 6 is a view illustrating an object setting screen according to an embodiment of the disclosure.

The processor 120 may identify an object being drawn on the object setting screen in real time.

For example, the processor 120 may identify the user's touch input on the object setting screen in real time through information on a point where the touch input included in the coordinate data received from the touch screen is detected, and identify the object being drawn on the object setting screen in real time by identifying the user's drag input on the object setting screen in real time through information on the drag path included in the coordinate data received from the touch screen.

Also, while the object is being drawn by the user's gesture, the processor 120 may identify a similarity between the plurality of predefined objects and the object being drawn on the object setting screen in real time For example, the processor 120 may compare the shape of each of the plurality of objects predefined in the electronic device 100 and the shape of the object being drawn on the object setting screen in real time to identify the similarity in real time.

Then, the processor 120 may provide visual feedback showing the identified similarity through a display.

For example, referring to FIG. 6, when the similarity between at least one of the plurality of predefined objects and the object being drawn on the object setting screen is 80%, the processor 120 may display a UI 611 such as "similarity 80%".

As described above, the electronic apparatus may induce an object different from the predefined objects to be drawn by providing visual feedback indicating the similarity between the plurality of predefined objects and the object being drawn on the object setting screen, in real time, Accordingly, an object having high security may be set as an object capable of unlocking the lock mode.

Figure 7A:
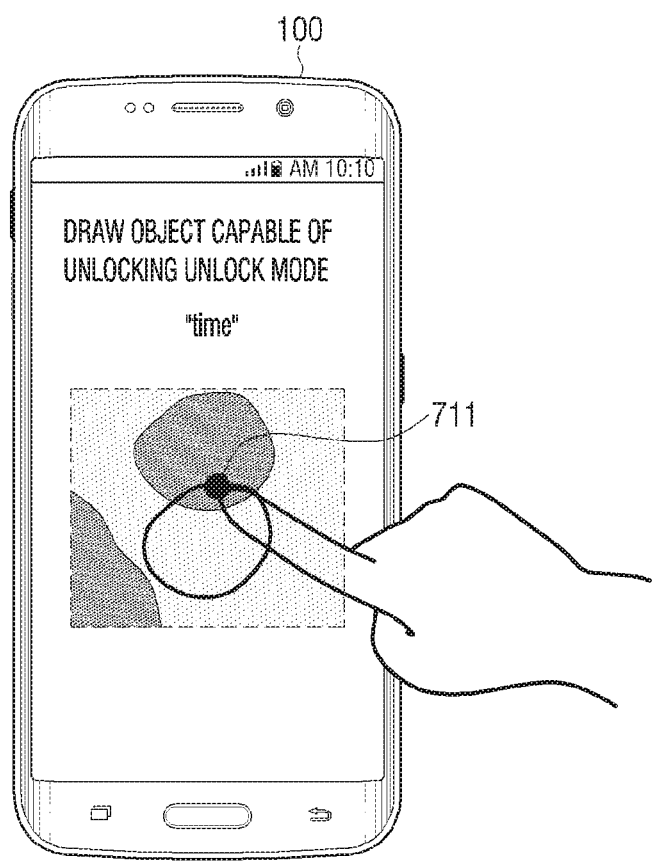
FIGS. 7A, 7B and 7C are views illustrating an object setting screen according to an embodiment of the disclosure.
Figure 7B:
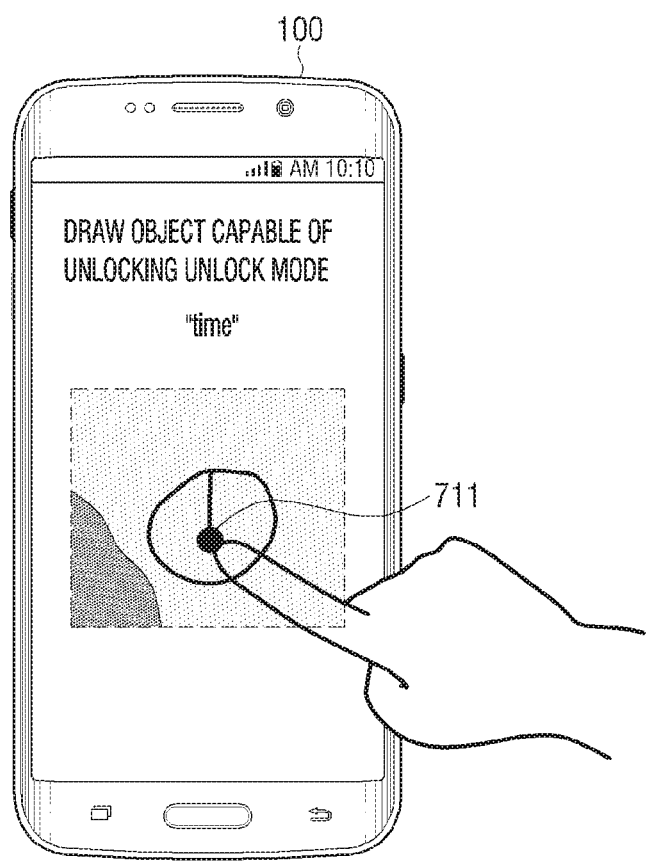
Figure 7C:
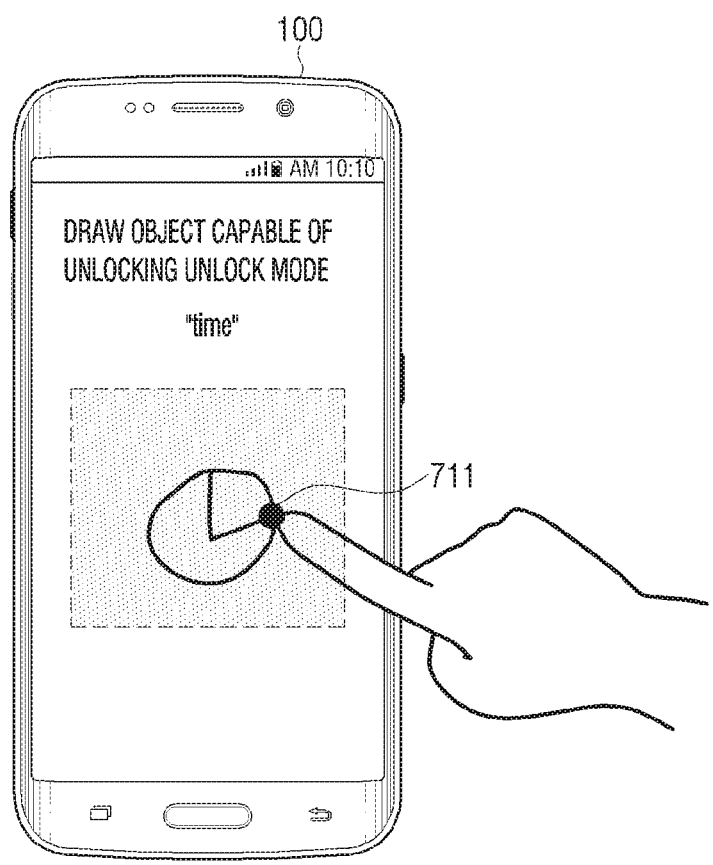

FIGS. 7A, 7B and 7C are views illustrating an object setting screen according to an embodiment of the disclosure.

As described above, the processor 120 may identify the object being drawn on the object setting screen in real time.

Then, while the object is being drawn by the user's gesture, the processor 120 may identify the similarity between an entire object to be drawn according to an additional gesture following the user's gesture and the plurality of predefined objects. The entire object to be drawn according to the additional gesture means an object not drawn on the object setting screen.

For this operation, the processor 120 may firstly predict the entire object to be drawn according to the additional gesture.

For example, as illustrated in FIG. 7A, when a circular object is drawn by the user's gesture, the processor 120 may predict an entire object be drawn according to the additional gesture based on a point 711 where the user's touch is maintained. The additional gesture may be not only a gesture moving in a first direction based on the point 711 where the user's touch is maintained but also a gesture moving in a second direction different from the first direction. In other words, the additional gesture may be a gesture that moves in a plurality of directions respectively based on the point 711 where the user's touch is maintained.

Then, the processor 120 may identify a similarity between the entire object to be drawn by the additional gesture and the plurality of predefined objects. For example, the processor 120 may identify the similarity by comparing the shape of the entire object to be drawn by the additional gesture and the shape of the plurality of predefined objects, respectively.

For example, in the above-described embodiment, the processor 120 may identify a similarity between the entire object to be drawn by the additional gesture which moves in one direction of the plurality of directions based on the point where the user's touch is maintained and the plurality of predefined objects.

Also, the processor 120 may display a color corresponding to the similarity between the entire object to be drawn by the additional gesture and the plurality of predefined objects in a direction where the additional gesture is to be input.

For example, in the above-described embodiment, the processor 120 may identify a similarly between an entire object to be drawn by the additional gesture that moves in a first direction based on the point 711 where the user's touch is maintained and the plurality of predefined objects, and display color corresponding to the identified similarly on the first direction based on the point 711 where the user's touch is maintained.

Similarly, the processor 120 may display a color corresponding to a similarity between an entire object to be drawn by the additional gesture that moves in a second direction and the predefined plurality of objects on the second direction based on the point 711 where the user's touch is maintained. In other words, the processor 120 may display the color corresponding to the similarity between the entire object to be drawn by the additional gesture that moves in a plurality of directions, respectively, on the plurality of directions based on the point 711 where the user's touch is maintained.

The color corresponding to the similarity may vary according to the similarity. For example, the processor 120 may display a black-based color when the similarity is relatively high, and display a white-based color when the similarity is relatively low.

For example, as illustrated in FIG. 7A, when it is identified that an entire object to be drawn by an additional gesture that moves in an upward direction based on the point 711 where the user's touch is maintained is more similar to at least one of the plurality of predefined objects than an entire object to be drawn by the additional gesture that moves in a downward direction, the processor may display a white-based color on the downward direction and a black-based color on the upward direction.

Accordingly, as illustrated in FIGS. 7B and 7C, the electronic device 100 according to an embodiment of the disclosure may induce the user to perform an additional gesture in a direction where the white-based color is displayed. In other words, it may induce an object with high security to be set as an object capable of unlocking the lock mode.

Figure 8A:
FIGS. 8A and 8B are views illustrating a lock screen according to an embodiment of the disclosure.
Figure 8B:

FIGS. 8A and 8B are views illustrating a lock screen according to an embodiment of the disclosure.

As described above, when the electronic device 100 is in the lock mode, the processor 120 may display a lock screen on a display 110.

The processor 120 may display the lock screen including words on the display 110. The word may be a word displayed on the object setting screen.

For example, when a word "food" is displayed on the object setting screen, as illustrated in FIG. 8A, the word "food" may be included in the lock screen.

For this operation, the processor 120 may store the word displayed on the object setting screen in a storage unit (not illustrated).

This considers user convenience. This is because, when the word displayed on the object setting screen is displayed on the lock screen, the object set by the user may be easily recalled from the user's point of view.

Also, when the object drawn on the lock screen corresponds to the stored object, the processor 120 may unlock the lock mode of the electronic device 100. The stored object may be an object drawn by the user on the object setting screen.

Specifically, when a touch and a drag following the touch are detected by a touch screen, the processor 120 may identify the touch and the drag following the touch to identify a shape of the object drawn on the lock screen.

The processor 120 may compare the shape of the object drawn on the lock screen with the shape of the stored object, and when it is confirmed that they are matched more than a predetermined threshold value, the processor 120 may identify that the object drawn on the lock screen corresponds to the stored object.

Meanwhile, when the object matches the shape of the object storing the drawn object more than the predetermined threshold value, whether the object is drawn on any area of the lock screen, the processor 120 may confirm that the object drawn on the lock screen corresponds to the stored object. In other words, there will be no restriction on the area in which the object is drawn on the lock screen.

Accordingly, the user may conveniently unlock the lock mode without looking at the screen of the electronic device 100.

In addition, regardless of the size of the drawn object, when the shape of the drawn object matches the shape of the stored object more than the predetermined threshold value, the processor 120 may confirm that the object drawn on the lock screen corresponds to the stored object. In other words, there will be no restriction on the size of the object drawn on the lock screen.

Thereafter, when the lock mode of the electronic device 100 is unlocked, the processor 120 may display a screen showing various menus.

Meanwhile, as the object corresponding to the object stored on the lock screen including the word is drawn, when the lock mode of the electronic apparatus 100 is unlocked more than the predetermined number of times, the processor 120 may display a lock screen which does not include a word on the display 110.

For example, as illustrated in FIG. 8B, when the lock mode of the electronic device 100 is unlocked more than the predetermined number of times, the processor 120 may display the lock screen that does not include a word on the display.

The predetermined number of times may be not only the default number of times but also the number of times set according to a user command. As an embodiment, the predetermined number of times may be five.

This considers security of the electronic device 100. This is because if the object displayed on the object setting screen is continuously displayed on the lock screen, an object stored in the electronic device 100 may be leaked by a third party.

In addition, if the lock mode of the electronic device 100 is unlocked for more than the predetermined number of times, even if a lock screen that does not include a word is displayed, the user may easily recall the object set by the user so that the user may not feel discomfort caused by not remembering the predetermined object.

Figure 9:
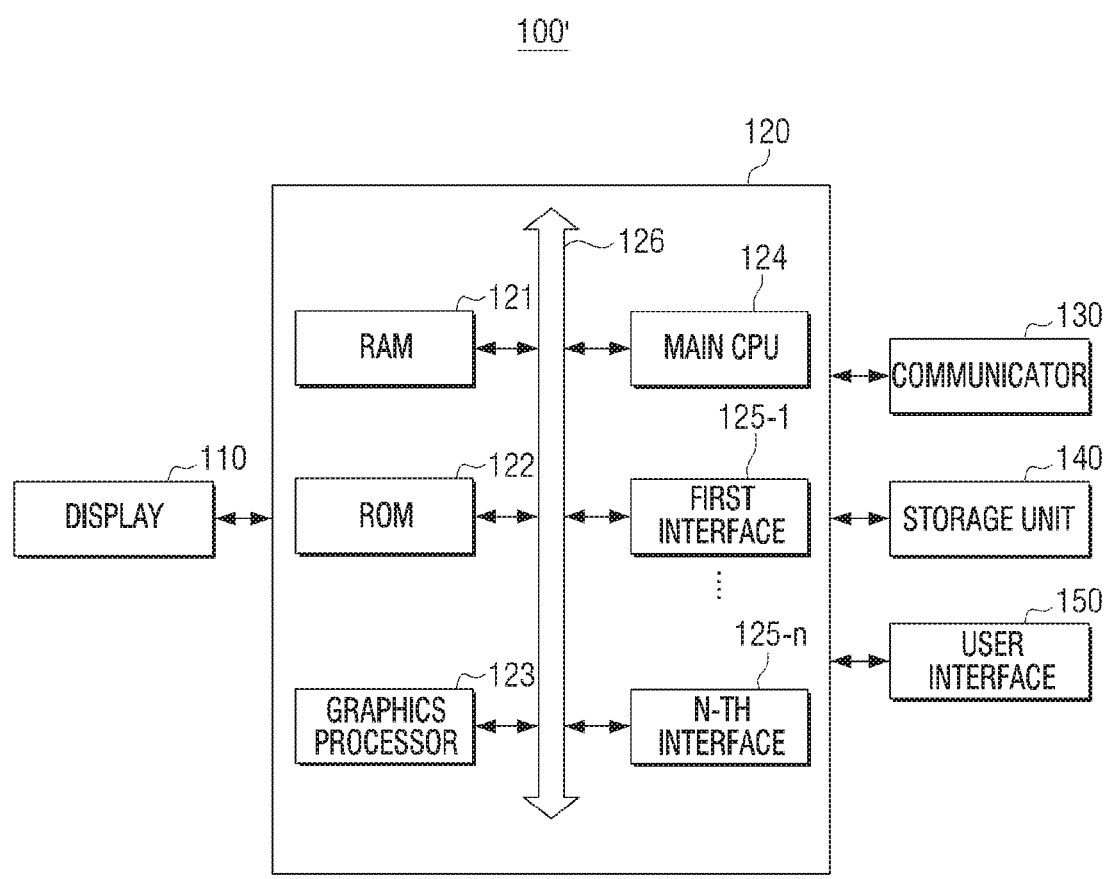
FIG. 9 is a detailed block diagram illustrating an electronic apparatus according to an embodiment of the disclosure.

FIG. 9 is a detailed block diagram illustrating an electronic apparatus according to an embodiment of the disclosure.

Referring to FIG. 9, the electronic apparatus 100' may include a display 110, a processor 120, a communicator 130, a storage unit 140, and a user interface 150. Hereinafter, parts overlapping with the foregoing description will be omitted or abbreviated.

The communicator 130 may be configured to communicate with various external devices. For example, the communicator 130 may transmit and receive various data by performing communication with a server.

For example, the communicator 130 may receive information on a plurality of objects updated from a server. The information on the plurality of objects may include information on newly defined objects other than the predefined plurality of objects stored in the storage unit 140.

Accordingly, the processor 120 may further consider information on the updated plurality of objects received from the server in addition to the predefined plurality of objects, and induce an object having high security to be drawn on the object setting screen.

In addition, the communicator 130 may transmit information on the object drawn on the object setting screen to the server, and may receive information on the similarity between the object drawn on the object setting screen and the plurality of predefined objects from the server.

In other words, the electronic device 100' according to an embodiment of the disclosure may display not only similarity between objects identified by the processor 120 on the display 110, but also similarity between objects received from the server on the display 110.

For this operation, the communicator 130 may include a Wi-Fi chip, a Bluetooth chip, a wireless communication chip, or the like.

The storage unit 140 may store an operating system (OS) for controlling an overall operation of the electronic apparatus 100, and commands or data related to components of the electronic apparatus 100'.

Accordingly, the processor 120 may control a plurality of hardware components or software elements of the electronic apparatus 100' by using diverse commands or data in the storage unit 140, load and process a command or data received from at least one of the other components in a volatile the memory, and store diverse data in a non-volatile the memory.

A user interface 150 may receive various user commands. For example, the user interface 150 may receive user commands related to various UI screens for function control of the electronic device 100' provided through the display 110. For example, when the user interface 150 is implemented as the display 110, it may be a touch screen.

The processor 120 controls the overall operations of the electronic apparatus 100.

Particularly, the processor 120 may include a RAM 121, a ROM 122, a graphics processor 123, a central processing unit (CPU) 124, first through n-th interfaces 125-1-135-*n* (collectively "125"), and a bus 126. For example, the RAM 121, the ROM 122, the graphic processing unit 123, the main CPU 124, the first to n-th interfaces 125-1 to 125-*n*, and the like may be connected to each other through the bus 126.

The first to n-th interfaces 125-1 to 125-*n* may be connected to the aforementioned various components. One of the interfaces 245-1 to 245-*n* may be realized as a network interface connected to an external apparatus through a network.

The main CPU 124 accesses the storage unit 140 to perform booting by using an O/S stored in the storage unit 140. The main CPU 124 may perform various operations by using various types of programs, contents, and data, etc. stored in the storage unit 140.

The RAM 121 stores a command set, etc. for system booting. If a turn-on command is input and thus, power is supplied, the main CPU 124 copies the O/S stored in the storage unit 140 into the RAM 121 according to a command stored in the ROM 122, and boots a system by executing the O/S. When the booting is completed, the main CPU 124 copies various programs stored in the storage unit 140 to the RAM 121, and executes the programs copied in the RAM 121 to perform various operations.

The graphic processor 123 may generate a screen including various objects, such as icons, images, or text, by using a computing unit and a rendering unit. The computing unit may compute attribute values, such as coordinate values, shapes, sizes, and colors of the objects, according to a layout of the screen based on the received control command. The rendering unit may generate a screen including the objects in various layouts based on the attribute values computed by the computing unit. The screen generated by the rendering unit may be displayed in the display 110.

Figure 10:
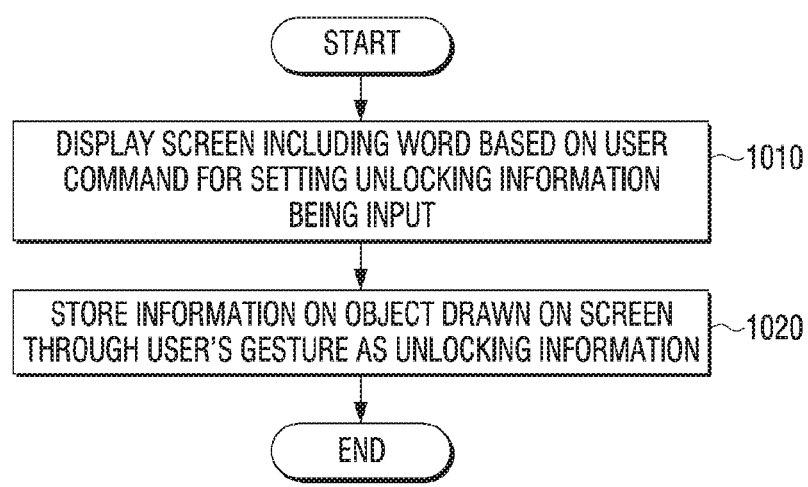
FIG. 10 is a flow chart illustrating an operation of an electronic apparatus according to an embodiment of the disclosure.

FIG. 10 is a flow chart illustrating an operation of an electronic apparatus according to an embodiment of the disclosure.

When a user command for setting unlocking information is input, the electronic device 100 may display a screen including a word (S1010). Specifically, when the user command for setting unlocking information is input, the electronic device 100 may display an object setting screen requiring input of an object capable of unlocking the lock mode of the electronic device 100.

The word may be a word that induces an object related to the word to be drawn on the screen. For example, the word may be "food". In this case, the user may associate the word "food" with various objects such as "hamburger", "pizza", "fish", "bread", "watermelon", "cherry", "cake", or the like.

Then, the electronic device 100 may store information on the object drawn on the screen through the user's gesture as unlocking information (S1020). Specifically, the electronic device 100 may identify a user's touch input on the object setting screen and a drag following the touch, and identify an object drawn on the object setting screen, then store information on the object drawn on the object setting screen as unlocking information. The information on the object may include information on the shape of the object drawn on the object setting screen.

Thereafter, when the object drawn on the lock screen corresponds to information on the stored object, the electronic device 100 may unlock the lock mode of the electronic device 100.

The methods according to the above-described example embodiments may be realized as software or applications that may be installed in the existing electronic apparatus.

Further, the methods according to the above-described example embodiments may be realized by upgrading the software or hardware of the existing electronic apparatus.

The above-described example embodiments may be executed through an embedded server in the electronic apparatus or through an external server outside the electronic apparatus.

A non-transitory computer readable medium in which a program sequentially performing the controlling method according to the present disclosure is stored may be provided.

The non-transitory computer readable recording medium refers to a medium that stores data and that can be read by devices. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Although the preferred exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:

1. An electronic apparatus comprising:
a touch screen display; and
a processor configured to:
based on identifying a first command input to the touch screen display for setting unlocking information for unlocking the electronic apparatus, control the touch screen display to display a setting screen for setting the unlocking information, the setting screen including a word for inducing drawing on the touch screen display of an object related to the word;
store, as the unlocking information, information related to the drawn object; and
unlock the electronic apparatus from a locked mode based on identifying, using the unlocking information, that a drawing input to a lock screen displayed on the display corresponds to the unlocking information,
wherein the processor is configured to:
while the object is being drawn, control to display on the touch screen display at least one of a user interface (UI) for inducing a change of the drawn object or a visual feedback based on a similarity between the drawn object and a pre-defined plurality of objects.

2. The apparatus of claim 1, wherein the lock screen includes the word.

3. The apparatus of claim 2, wherein the word is included on the lock screen for a predetermined number of unlockings of the electronic apparatus from the locked mode and is not included on the lock screen for unlockings after the predetermined number of unlockings.

4. The apparatus of claim 1, wherein the processor is configured to:
based on identifying a second command input to the touch screen display for changing the word, change the word to another word.

5. An electronic apparatus comprising:
a touch screen display; and
a processor configured to:
based on identifying a first command input to the touch screen display for setting unlocking information for unlocking the electronic apparatus, control the touch screen display to display a setting screen for setting the unlocking information, the setting screen including a word for inducing drawing on the touch screen display of an object related to the word;
store, as the unlocking information, information related to the drawn object; and
unlock the electronic apparatus from a locked mode based on identifying, using the unlocking information, that a drawing input to a lock screen displayed on the display corresponds to the unlocking information,
wherein the processor is configured to:
while the object is being drawn, identify a similarity between an entire object drawn by further drawing and a pre-defined plurality of objects; and
display a color corresponding to the similarity in a direction for inputting the further drawing.

6. A control method of an electronic apparatus, the method comprising:
based on identifying a first command input to a touch screen display for setting unlocking information for unlocking the electronic apparatus, displaying, on the touch screen display, a setting screen for setting the unlocking information, the setting screen including a word for inducing drawing on the touch screen display of an object related to the word;
storing, as the unlocking information, information related to the drawn object; and
unlocking the electronic apparatus from a locked mode based on identifying, using the unlocking information, that a drawing input to a lock screen displayed on the display corresponds to the unlocking information,
wherein the method further comprises:
while the object is being drawn, displaying, on the touch screen display, at least one of a user interface (UI) for inducing a change of the drawn object or a visual feedback based on a similarity between the drawn object and a pre-defined plurality of objects.

7. The method of claim 6, wherein the lock screen includes the word.

8. The method of claim 7, wherein the word is included on the lock screen for a predetermined number of unlockings of the electronic apparatus from the locked mode and is not included on the lock screen for unlockings after the predetermined number of unlockings.

9. The method of claim 6, further comprising:
based on identifying a second command input to the touch screen display for changing the word, change the word to another word.

10. A control method of an electronic apparatus 9, the method comprising:
based on identifying a first command input to a touch screen display for setting unlocking information for unlocking the electronic apparatus, displaying, on the touch screen display, a setting screen for setting the unlocking information, the setting screen including a word for inducing drawing on the touch screen display of an object related to the word;
storing, as the unlocking information, information related to the drawn object; and
unlocking the electronic apparatus from a locked mode based on identifying, using the unlocking information, that a drawing input to a lock screen displayed on the display corresponds to the unlocking information, the method further comprising:
identifying a similarity between the drawn object and at least one of a pre-defined plurality of objects; and
based on the similarity being greater than a threshold value, displaying a user interface (UI) for inducing a change of the drawn object.

* * * * *